United States Patent
Lee et al.

(10) Patent No.: US 9,481,746 B2
(45) Date of Patent: Nov. 1, 2016

(54) MODIFIED HIGH-CIS ISOPRENE POLYMER, METHOD FOR PRODUCING THE SAME, AND TIRE CONTAINING AFOREMENTIONED POLYMER

(71) Applicant: Chi Mei Corporation, Tainan (TW)

(72) Inventors: Chih-Cheng Lee, Tainan (TW); Hung-Jui Kuo, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 14/572,787

(22) Filed: Dec. 17, 2014

(65) Prior Publication Data

US 2015/0166698 A1    Jun. 18, 2015

(30) Foreign Application Priority Data

Dec. 18, 2013   (TW) .............................. 102146895 A

(51) Int. Cl.
| | |
|---|---|
| C08F 136/08 | (2006.01) |
| B60C 1/00 | (2006.01) |
| C08C 19/25 | (2006.01) |
| C08C 19/44 | (2006.01) |

(52) U.S. Cl.
CPC ............. *C08F 136/08* (2013.01); *B60C 1/00* (2013.01); *C08C 19/25* (2013.01); *C08C 19/44* (2013.01); *C08F 2410/01* (2013.01)

(58) Field of Classification Search
CPC ......... B60C 1/00; C08C 19/25; C08C 19/44; C08F 136/08; C08F 2410/01
USPC .............................................. 525/333.1, 342
See application file for complete search history.

(56) References Cited

U.S. PATENT DOCUMENTS

| | | | |
|---|---|---|---|
| 3,297,667 A | 1/1967 | von Dohlen | |
| 3,794,604 A | 2/1974 | Throckmorton | |
| 4,520,177 A | 5/1985 | Jenkins | |
| 4,544,718 A | 10/1985 | Yeh et al. | |
| 5,064,910 A | 11/1991 | Hattori et al. | |
| 5,220,045 A | 6/1993 | Knauf et al. | |
| 6,992,147 B1* | 1/2006 | Ozawa | C08C 19/44 525/105 |
| 2006/0030677 A1 | 2/2006 | Ozawa et al. | |
| 2009/0020209 A1* | 1/2009 | Wada | B60C 1/00 152/564 |
| 2013/0158205 A1* | 6/2013 | Lee | C08C 19/44 525/333.1 |

FOREIGN PATENT DOCUMENTS

| | | |
|---|---|---|
| EP | 1449857 | 8/2004 |
| EP | 1479698 | 11/2004 |
| TW | 200630395 | 9/2006 |
| TW | 200804486 | 1/2008 |
| TW | 201326226 | 7/2013 |
| WO | 9739055 | 10/1997 |
| WO | 2009072650 | 6/2009 |

OTHER PUBLICATIONS

"Office Action of Taiwan Counterpart Application", issued on Feb. 4, 2015, p. 1-p. 8.

* cited by examiner

*Primary Examiner* — Ling Choi
*Assistant Examiner* — Chun-Cheng Wang
(74) *Attorney, Agent, or Firm* — Jianq Chyun IP Office

(57) ABSTRACT

A modified high-cis isoprene polymer, a method for producing the same, and a tire containing the aforementioned polymer are provided. A polymerization reaction is performed on isoprene monomers in an organometallic catalyst system to form a high-cis isoprene polymer having an organometallic active site, wherein the organometallic active site is formed by an organometallic catalyst system. The high-cis isoprene polymer having the organometallic active site is reacted with a modifier mixture including a first modifier and a second modifier via the organometallic active site. The first modifier and the second modifier are compounds represented by formula 1 and formula 2, respectively:

$$X-R1-Si(R2)_3 \quad \text{formula 1, and}$$

$$R3-Si(R4)_3 \quad \text{formula 2,}$$

wherein X, R1, R2, R3, and R4 are defined in the specification.

12 Claims, No Drawings

MODIFIED HIGH-CIS ISOPRENE POLYMER, METHOD FOR PRODUCING THE SAME, AND TIRE CONTAINING AFOREMENTIONED POLYMER

CROSS-REFERENCE TO RELATED APPLICATION

This application claims the priority benefit of Taiwan application serial no. 102146895, filed on Dec. 18, 2013. The entirety of the above-mentioned patent application is hereby incorporated by reference herein and made a part of this specification.

BACKGROUND OF THE INVENTION

1. Field of the Invention

The invention relates to a modified high-cis isoprene polymer, a method for producing the same, and an application thereof. More particularly, the invention relates to a modified high-cis isoprene polymer which contains more than 97% of a cis-1,4-structure, a method for producing the same, and an application thereof.

2. Description of Related Art

The conjugated diene polymer is widely used in resin modification and various industrial products, one application of which is the production of tires. With the rising awareness of environmental protection in recent years, the requirements for tire performance have become high. For instance, it is desired to be able to achieve low fuel consumption and low wear loss. To conform to the trend, it is necessary to improve the mechanical properties of the conjugated diene polymer such as rolling resistance, wet skid resistance, and tensile strength. Moreover, carbon black is generally added to the conjugated diene polymer of the conventional tire to increase the strength of tires.

In the known technique, butadiene is generally used to prepare the conjugated diene polymer suitable for tires. The conjugated diene polymer prepared by using butadiene is mainly used in the sidewall of tires, with a focus of heat generation. In addition to using the conjugated diene polymer prepared by butadiene, the tires also need natural rubber, and in addition to being used on the tire surface with a focus of rolling resistance, natural rubber can also be used in ply with a focus of tear resistance. Although the rolling resistance and the tear resistance of the high-cis isoprene polymer are not as good as those of natural rubber, with the increasing price of natural rubber, the development of a high-cis isoprene polymer having the same or even better tear resistance as natural rubber is still needed. Therefore, how to provide a high-cis isoprene polymer to replace natural rubber is an issue in the industry that needs to be solved.

SUMMARY OF THE INVENTION

The invention provides a modified high-cis isoprene polymer, a method for producing the same, and an application thereof. The produced modified high-cis isoprene polymer has excellent physical properties and good compatibility with carbon black, and can therefore be used to make a quality tire.

The invention provides a method for producing a modified high-cis isoprene polymer. The method includes the following steps. A polymerization reaction is performed on isoprene monomers in an organometallic catalyst system to form a high-cis isoprene polymer having an organometallic active site, wherein the organometallic active site is formed by the organometallic catalyst system. The organometallic catalyst system includes an organic carboxylate of a rare earth metal, an organoaluminum compound and a halogen donor, wherein a molecular formula of the organoaluminum compound is $AlR_3$ or $HAlR_2$, R is a $C_1$~$C_8$ alkyl group, and the halogen donor includes alkylaluminum halide. The high-cis isoprene polymer having the organometallic active site is reacted with a modifier mixture via the organometallic active site to form a modified high-cis isoprene polymer, wherein the modifier mixture includes a first modifier and a second modifier. The first modifier is a compound represented by formula 1:

$$X\text{—}R1\text{-}Si(R2)_3 \quad \text{formula 1,}$$

wherein X is a glycidoxy group, an isocyanate group, or a 2-(3,4-epoxycyclohexyl) group; R1 is a $C_2$~$C_3$ alkylene group; and R2 is a group selected from the group consisting of a $C_2$~$C_3$ alkyl group and a $C_1$~$C_3$ alkoxy group. The second modifier is a compound represented by formula 2:

$$R3\text{-}Si(R4)_3 \quad \text{formula 2,}$$

wherein R3 is a group selected from the group consisting of a $C_1$~$C_{12}$ alkoxy group and a $C_1$~$C_{12}$ aryloxy group; and R4 is a group selected from the group consisting of a $C_1$~$C_{12}$ alkyl group, a $C_1$~$C_{12}$ alkoxy group, a $C_1$~$C_{12}$ aryloxy group, and a $C_1$~$C_{12}$ cycloalkyl group.

In an embodiment of the invention, the molar ratio of each of the first modifier and the second modifier is 1:3 to 10:1.

In an embodiment of the invention, the organometallic catalyst system further contains isoprene monomer.

In an embodiment of the invention, the molar ratio of the first modifier and the organic carboxylate of the rare earth metal is 1:1 to 5:1.

In an embodiment of the invention, the molar ratio of the organoaluminum compound and the organic carboxylate of the rare earth metal is 10:1 to 18:1.

In an embodiment of the invention, the first modifier includes 2-glycidoxyethyltrimethoxy silane, 2-glycidoxyethyltriethoxy silane, (2-glycidoxyethyl)methyldimethoxy silane, 3-glycidoxypropyltrimethoxy silane, 3-glycidoxypropyltriethoxy silane, methyl(3-glycidoxypropyl)dimethoxy silane, 2-(3,4-epoxycyclohexyl)ethyltrimethoxy silane, 2-(3,4-epoxycyclohexyl)ethyltriethoxy silane, 2-(3,4-epoxycyclohexyl)ethyl(methyl)dimethoxy silane, 3-isocyanatopropyltrimethoxy silane, 3-isocyanatopropyltriethoxy silane, 3-isocyanatopropylmethyldiethoxy silane, 3-isocyanatopropyltriisopropoxy silane, or a combination thereof.

In an embodiment of the invention, the second modifier includes tetramethoxysilane, tetraethoxy silane, tetrapropoxysilane, tetrabutoxysilane, methyl(trimethoxy)silane, methyl(triethoxy)silane, methyl(tripropoxy)silane, ethyl(trimethoxy) silane, ethyl(triethoxy)silane, ethyl(tripropoxy) silane, propyl(trimethoxy)silane, propyl(triethoxy)silane, propyl(tripropoxy)silane, butyl(trimethoxy)silane, butyl(triethoxy)silane, butyl(tripropoxy)silane, phenyl(tri-methoxy) silane, phenyl(tri-ethoxy)silane, phenyl(tripropoxy)silane, phenyl(tri-n-butoxy) silane, dimethyldimethoxysilane, diethyldiethoxysilane, methylphenyl(dimethoxy)silane, methylphenyl(diethoxy)silane, dicyclohexyl(diphenoxy) silane, didecyl(didecoxy) silane, tetradodecoxy silane, tetraphenoxy silane, or a combination thereof.

The invention provides a modified high-cis isoprene polymer produced by the aforementioned method for producing a modified high-cis isoprene polymer.

In an embodiment of the invention, the isoprene repeating unit in the modified high-cis isoprene polymer contains more than 97% of a cis-1,4-structure, and the polydispersity (PDI) of the modified high-cis isoprene polymer is greater than 1.5 and less than 2.7.

In an embodiment of the invention, the modified high-cis isoprene polymer contains neodymium in an amount greater than 120 ppm and less than 330 ppm.

In an embodiment of the invention, in the modified high-cis isoprene polymer, the content ratio of aluminum and neodymium is 2:1 to 8:1.

The invention provides a tire containing the modified high-cis isoprene polymer produced by the aforementioned method for producing a modified high-cis isoprene polymer.

Based on the above, by performing modification using two modifiers at the same time in an organometallic catalyst system, the method for producing a modified high-cis isoprene polymer provided by the invention can prepare a modified high-cis isoprene polymer having excellent physical properties and good compatibility with carbon black. Therefore, the modified high-cis isoprene polymer of the invention is suitable for the production of a high-quality tire.

In order to make the aforementioned features and advantages of the disclosure more comprehensible, embodiments accompanied with figures are described in detail below.

DESCRIPTION OF THE EMBODIMENTS

A modified high-cis isoprene polymer and a method for producing the same are described in detail in the following with reference to embodiments.

In the specification, if it is not specified whether a particular group is substituted or not, then the group can represent a substituted or an unsubstituted group. For instance, "alkyl group" can represent a substituted or an unsubstituted alkyl group. In addition, when a particular group is described with "$C_x$", it means that the main chain of that particular group has an X number of carbon atoms.

In the specification, "phr (part per hundred rubber)" is sometimes used as a unit of additive amount. phr is a common terminology in the field of rubber synthesis, and means "parts by weight added per 100 parts by weight of rubber". Moreover, the so-called "rubber" here refers to a high-cis isoprene polymer.

The first embodiment of the invention provides a method for producing a modified high-cis isoprene polymer. The method includes the following steps:

Step A: a polymerization reaction is performed on isoprene monomers in an organometallic catalyst system to form a high-cis isoprene polymer having an organometallic active site, wherein the organometallic active site is formed by an organometallic catalyst system; and Step B: without removing the activity of the organometallic active site, the high-cis isoprene polymer having the organometallic active site is reacted with a modifier mixture via the organometallic active site to form a modified high-cis isoprene polymer.

Step A is described first.

In the invention, the organometallic catalyst system is preferably formed by a compound containing a rare earth metal of atomic number 57~71 in the Periodic Table (i.e. a rare earth metal compound), an organoaluminum compound, a halogen donor, and/or a conjugated diene monomer. Moreover, the organometallic catalyst system can further include an alumoxane component.

In the invention, the rare earth metal is preferably, for instance, neodymium, praseodymium, cerium, lanthanum, germanium, or a mixture of the elements. The rare earth metal compound is preferably a salt capable of being dissolved in a solvent, such as an organic carboxylate of a rare earth metal, an alkoxide of a rare earth metal, a β-diketone complex of a rare earth metal, a phosphate ester salt of a rare earth metal, and a phosphite ester salt of a rare earth metal, and is most preferably an organic carboxylate of a rare earth metal.

In the invention, the organic carboxylate can be a straight-chain, branched, or cyclic structures of alkyl group, alkenyl group, or phenyl group. Moreover, the carboxylic acid is not limited to be bonded to a primary carbon, and can also be bonded to a secondary carbon or a tertiary carbon. Examples of the organic carboxylate include, for instance: octanoate, 2-ethylhexanoate, oleate, neodecanoate, Versatic acid provided by Shell, stearate, naphthenic acid, or benzoate. The alkoxy group of the alkoxide can be, for instance, a 2-ethylhexylalkoxy group, an oleylalkoxy group, a stearylalkoxy group, a phenoxy group, or a benzylalkoxy group. The β-diketone complex can be, for instance, an acetylacetone complex, a benzoylacetone complex, a propionitrileacetone complex, a valerylacetone complex, or an ethylacetylacetone complex. The phosphate ester moiety of the phosphate ester salt can be, for instance, bis(2-ethylhexyl) phosphate, bis(1-methylheptyl)phosphate, bis(p-nonylphenyl) phosphate, bis(polyethylene glycol-p-nonylphenyl) phosphate, bis(1-methylheptyl)(2-ethylhexyl) phosphate, bis(2-ethylhexyl)(p-nonylphenyl) phosphate, mono-2-ethylhexyl 2-ethylhexylphosphonate or mono-p-nonylphenyl 2-ethylhexylphosphonate. The phosphite ester moiety of the phosphite ester salt can be, for instance, bis(2-ethylhexyl)phosphite, bis(1-methylheptyl)phosphite, bis(p-nonylphenyl) phosphite, bis(1-methylheptyl)(2-ethylhexyl)phosphite, or bis(2-ethylhexyl)(p-nonylphenyl)phosphite.

Examples of the rare earth metal compound may include salts such as neodymium trichloride, didymium trichloride (formed by 72 wt % of neodymium, 20 wt % of lanthanum, and 8 wt % of praseodymium). Examples of the organic carboxylate of the rare earth metal include: neodymium 2-ethylhexanoate, didymium 2-ethylhexanoate, neodymium naphthenate, neodymium 2,2-diethylhexanoate, neodymium neodecanoate, or a combination thereof. In an embodiment, the organic carboxylate of the rare earth metal is neodymium neodecanoate.

The molecular formula of the organoaluminum compound is $AlR_3$, $HAlR_2$, or $H_2AlR$, wherein R is a $C_1$~$C_8$ alkyl group. Examples of the organoaluminum compound include: trimethylaluminum, triethyl aluminum, triisopropyl aluminum, tributylaluminum, triisobutylaluminum (TIBA), trihexylaluminum, tricyclohexylaluminum, tri-n-octyl aluminum, diethylaluminum hydride, dipropylaluminum hydride, dibutylaluminum hydride, diisobutyl aluminum hydride (DIBAH), ethylaluminum dihydride, propylaluminum dihydride, isobutylaluminum dihydride, or a combination thereof. In an embodiment, the organoaluminum compound is TIBA.

The halogen donor includes alkylaluminum halide, wherein the alkylaluminum halide can have a structural formula such as $R'AlCl_2$, $R'_3Al_2Cl_3$, or $R'_2AlCl$, wherein R' is a $C_8$~$C_{12}$ hydrocarbon. Examples of the halogen donor include: dimethylaluminum chloride, diethylaluminum chloride (DEAC), diisobutyl aluminum chloride (DIBAC), dioctylaluminum chloride, ethylaluminum sesquichloride, ethylaluminum dichloride, or a corresponding bromide or iodide of the compounds. In an embodiment, the halogen donor is diethylaluminum chloride. In addition to the aforementioned organic carboxylate of the rare earth metal, organoaluminum compound, and halogen donor, the contents of U.S. Pat. No. 3,297,667 and U.S. Pat. No. 3,794,604 can also be used, wherein the contents are incorporated into the present text by reference.

In the present embodiment, the organometallic catalyst system is preferably further formed by isoprene monomer or other conjugated diene monomers, an organic carboxylate of a rare earth metal, an organoaluminum compound, and a halogen donor. Specifically, in the organometallic catalyst system, a small amount of isoprene monomers or other conjugated diene monomers other than used to form the isoprene polymer by polymerization can be added so as to increase the catalytic activity of the organometallic catalyst system and reduce the induction time of the organometallic catalyst system in the initial polymerization stage. Moreover, the addition time of the isoprene monomers or the other conjugated diene monomers is not particularly limited, and can be at any time point when each organometallic catalyst material (i.e., the organic carboxylate of the rare earth metal, the organoaluminum compound, and the halogen donor) are added. Moreover, the amount of the isoprene monomers is based on the organic carboxylate of the rare earth metal, that is, the number of moles of the organic carboxylate of the rare earth metal:the number of moles of the isoprene monomers is 1:0 to 1:1000, wherein 1:0.5 to 1:500 is preferred, and 1:2 to 1:100 is most preferred. In an embodiment, the high-cis isoprene polymer having the organometallic active site is mainly formed by the polymerization of the isoprene monomers in a content of at least 95%, wherein the polymer contains at least 95% of an isoprene repeating unit. Specifically, the polymerization reaction can contain other conjugated diene monomers in an amount not exceeding 5%, such as butadiene, 2-phenylbutadiene, 2,3-dimethylbutadiene, 1,3-hexadiene, 1,3-octadiene, or a combination thereof. Therefore, the obtained high-cis isoprene polymer having the organometallic active site can contain a repeating unit consisting of other conjugated diene monomers in an amount not exceeding 5%. Moreover, the isoprene repeating unit refers to a repeating structure unit in an unmodified high-cis isoprene polymer after isoprene monomers are copolymerized.

When the organometallic catalyst system is prepared, since the organoaluminum compound needs to be uniformly stirred and mixed with a suitable solvent, the preparation temperature of the organometallic catalyst system is limited by the boiling point of the solvent, and needs to be controlled between −20° C.~120° C. Each of the organometallic catalyst materials can be individually added. For instance, the organoaluminum compound and the organic carboxylate of the rare earth metal are added first, and then the halogen donor is added. If needed, the organoaluminum compound and the organic carboxylate of the rare earth metal can also be mixed together first for use before a polymerization reaction is performed on the isoprene monomers.

A 1,4-addition polymerization, a 3,4-addition polymerization, or a 1,2-addition polymerization can be performed on the isoprene monomers to form a 1,4-structure, a 3,4-structure, or a 1,2-structure. "1,4-polymerization" refers to the bonding of the isoprene monomers to other monomers through carbons at positions 1 and 4 of the isoprene monomers. The 1,4-structure polymerized according to the method can further be divided into cis and trans. "3,4-polymerization" refers to the bonding of the isoprene monomers to other monomers through carbons at positions 3 and 4 of the isoprene monomers. The 3,4-structure formed by the 3,4-polymerization is a structure ($-C(CH_3)=CH_2$) having a vinyl group located at a side chain. "1,2-polymerization" refers to the bonding of the isoprene monomers to other monomers through carbons at positions 1 and 2 of the isoprene monomers. The 1,2-structure formed by the 1,2-polymerization is a structure ($-CH=CH_2$) having a vinyl group located at a side chain. The 3,4-structure or the 1,2-structure is generally termed a vinyl structure. The 1,4-structure and the vinyl structure can coexist in a polymer chain. In other words, when polymerization is performed with the isoprene monomers, a 3,4-polyisoprene structure, a 1,2-polyisoprene structure, or a 1,4-polyisoprene structure can be produced.

In the first embodiment, a modified high-cis isoprene polymer is to be produced. That is, the isoprene repeating unit in the modified high-cis isoprene polymer is to contain more than 97% of a cis-1,4-structure, and therefore the polymerization reaction of the isoprene monomers needs to form a high ratio of a cis-structure. For this purpose, the ratio of each organometallic catalyst material in the organometallic catalyst system needs to be limited. Specifically, the number of moles of the organic carboxylate of the rare earth metal:the number of moles of the sum of the organoaluminum compound and the halogen donor is 1:1.5 to 1:100, preferably 1:1.5 to 1:60; the number of moles of the organic carboxylate of the rare earth metal:the number of moles of the halogen donor is controlled at 1:0.5 to 1:10; and the molar ratio of each of the organoaluminum compound and the organic carboxylate of the rare earth metal is 10:1 to 18:1.

Moreover, in step A, the isoprene monomers can be pumped into the reaction tank before the organometallic catalyst system is added or after the organometallic catalyst system is added, or the isoprene monomers can be added between the addition time of an organometallic catalyst material and the addition time of another organometallic catalyst material in the organometallic catalyst system, such that a polymerization reaction is performed on the isoprene monomers. Moreover, the isoprene monomers can be added all at once or added successively. The reaction tank used in the invention is preferably provided with a mixing equipment. One or a plurality of reaction tanks connected in series can be used, and a batch feeding method is preferred.

Moreover, step A can be performed in the presence of a solvent. The solvent can be an inert hydrocarbon-based solvent, and includes: an aliphatic hydrocarbon, an alicyclic hydrocarbon, an aromatic hydrocarbon, a monoolefin, or a mixture thereof. The hydrocarbon includes: an aliphatic hydrocarbon containing 4~8 carbon atoms, an alicyclic hydrocarbon containing 5~10 carbon atoms, an aromatic hydrocarbon containing 6~9 carbon atoms, a monoolefin containing 4~8 carbon atoms, or a combination of the compounds. Examples of the hydrocarbon include (but are not limited to): n-butane, n-pentane, n-hexane, n-heptane, cyclopentane, cyclohexane, benzene, toluene, xylene, 1-butene, and 1-pentene.

In an embodiment, preferably, the polymerization reaction is performed in a solvent without an aromatic hydrocarbon. That is, the polymerization reaction is performed in the hydrocarbon selected from the following: a $C_4$~$C_8$ aliphatic hydrocarbon, a $C_5$~$C_{10}$ alicyclic hydrocarbon, a $C_4$~$C_8$ monoolefin, or a combination of the compounds. In particular, n-hexane or cyclohexane is preferred since the organometallic catalyst system exhibits better activity in the solvents.

Moreover, in step A, the polymerization reaction is performed on the isoprene monomers in the organometallic catalyst system, and therefore a compound containing an organometallic active site is produced in the polymerization process via a reaction of the organometallic catalyst system and the isoprene monomers. The compound containing the organometallic active site can be used as a polymerization initiator or a polymerization reaction point such that the isoprene monomers are polymerized to form the high-cis isoprene polymer having the organometallic active site.

Step B is described next.

In step B, without losing the activity of the organometallic active site, that is, without stopping the polymerization reaction, the high-cis isoprene polymer having the organometallic active site obtained in step A is reacted with a modifier mixture via the organometallic active site to form a modified high-cis isoprene polymer, wherein the modifier mixture includes a first modifier and a second modifier.

The first modifier is a compound represented by formula 1:

X—R1-Si(R2)$_3$   formula 1, wherein X is a glycidoxy group, an isocyanate group, or a 2-(3,4-epoxycyclohexyl) group; R1 is a $C_2$~$C_3$ alkylene group; and R2 is a group selected from the group consisting of a $C_2$~$C_3$ alkyl group and a $C_1$~$C_3$ alkoxy group.

Specifically, examples of the first modifier include: 2-glycidoxyethyltrimethoxy silane, 2-glycidoxyethyltriethoxy silane, (2-glycidoxyethyl)methyldimethoxy silane, 3-glycidoxypropyltrimethoxy silane, 3-glycidoxypropyltriethoxy silane, methyl(3-glycidoxypropyl)dimethoxy silane, 2-(3,4-epoxycyclohexyl)ethyltrimethoxy silane, 2-(3,4-epoxycyclohexyl)ethyltriethoxy silane, 2-(3,4-epoxycyclohexyl)ethyl(methyl)dimethoxy silane, 3-isocyanatopropyltrimethoxy silane, 3-isocyanatopropyltriethoxy silane, 3-isocyanatopropylmethyldiethoxy silane, 3-isocyanatopropyltriisopropoxy silane, or a combination thereof.

Moreover, the second modifier is a compound represented by formula 2:

R3-Si(R4)3   formula 2, wherein R3 is a group selected from the group consisting of a $C_1$~$C_{12}$ alkoxy group and a $C_1$~$C_{12}$ aryloxy group; and R4 is a group selected from the group consisting of a $C_1$~$C_{12}$ alkyl group, a $C_1$~$C_{12}$ alkoxy group, a $C_1$~$C_{12}$ aryloxy group, and a $C_1$~$C_{12}$ cycloalkyl group.

Specifically, examples of the second modifier include: tetramethoxysilane, tetraethoxy silane, tetrapropoxysilane, tetrabutoxysilane, methyl(trimethoxy)silane, methyl(triethoxy)silane, methyl(tripropoxy)silane, ethyl(trimethoxy) silane, ethyl(triethoxy)silane, ethyl(tripropoxy)silane, propyl(trimethoxy)silane, propyl(triethoxy)silane, propyl (tripropoxy)silane, butyl(trimethoxy)silane, butyl(triethoxy) silane, butyl(tripropoxy)silane, phenyl(tri-methoxy)silane, phenyl(tri-ethoxy)silane, phenyl(tripropoxy)silane, phenyl (tri-n-butoxy) silane, dimethyldimethoxysilane, diethyldiethoxysilane, methylphenyl(dimethoxy)silane, methylphenyl(diethoxy)silane, dicyclohexyl(diphenoxy) silane, didecyl(didecoxy) silane, tetradodecoxy silane, tetraphenoxy silane, or a combination thereof.

In an embodiment, the molar ratio of each of the first modifier and the second modifier is 1:3 to 10:1, preferably 1:1 to 5:1.

In an embodiment, the molar ratio of each of the first modifier and the organic carboxylate of the rare earth metal in the organometallic catalyst system is 1:1 to 10:1, preferably 1:1 to 5:1.

The second embodiment of the invention provides a modified high-cis isoprene polymer. The modified high-cis isoprene polymer can be produced by executing step A and step B in the first embodiment. However, the invention is not limited thereto.

In the present embodiment, the isoprene repeating unit in the modified high-cis isoprene polymer contains more than 97% of a cis-1,4-structure. The polydispersity (PDI) of the modified high-cis isoprene polymer is greater than 1.5 and less than 2.7, preferably greater than 1.5 and less than 2.5, and more preferably greater than 1.5 and less than 2.4.

Moreover, in the modified high-cis isoprene polymer, the content ratio of aluminum and neodymium is 2:1 to 8:1, preferably 4:1 to 6:1.

In an embodiment, the modified high-cis isoprene polymer contains neodymium in an amount greater than 120 ppm and less than 330 ppm, preferably greater than 230 ppm and less than 330 ppm.

Moreover, the modified high-cis isoprene polymer of the invention can be applied in a rubber composition. Various agents or additives commonly used in the rubber industry can further be added to the rubber composition using the modified high-cis isoprene polymer of the invention according to need. Specifically, the rubber composition using the modified high-cis isoprene polymer of the invention can include, for instance, a filler material, an antioxidant, a coupling agent, a vulcanization activator, a vulcanization accelerator, a vulcanizing agent, an antiager, or a processing oil.

The filler material can be carbon black. Based on 100 parts by weight of the used rubber, the amount of the carbon black can be 10 to 100 parts by weight, preferably 20 to 90 parts by weight.

The antioxidant includes a phenolic compound having at least one hindered phenol functional group, such as: Ix-1076 made by CIBA; a dialkylphenyl triphosphite-type antioxidant; an aminated antioxidant such as naphthylamine, diphenylamine, or p-phenylenediamine; a phenol antioxidant such as trialkyl phenol, hydroquinone, or polyphenol, or a combination of the compounds. Based on 100 parts by weight of the used rubber, the amount of the antioxidant can be 0.2 to 1 part by weight.

The coupling agent includes bis-(3-triethoxysilylpropyl) tetrasulfide, bis-(3-triethoxysilylpropyl) disulfide, bis-(2-triethoxysilylethyl) tetrasulfide, 3-mercaptopropyltriethoxysilane, 3-triethoxysilyl propyl-N,N-dimethylthiocarbamoyl tetrasulfide, 3-triethoxysilylpropyl benzothiazole tetrasulfide, or a similar compound thereof. Based on 100 parts by weight of the used rubber, the amount of the coupling agent can be 1 to 15 parts by weight, preferably 5 to 10 parts by weight.

The vulcanization aid includes the vulcanization activator and the vulcanization accelerator. The vulcanization activator is, for instance, zinc oxide or stearic acid. The vulcanization accelerator can be mercapto-benzthiazole, sulfenamide, guanidine, dithiocarbamate, thiourea, or thiocarbonate. The vulcanization accelerator is preferably a sulfenamide accelerator, wherein the sulfenamide accelerator is, for instance, cyclohexylbenzothiazole-sulfenamide, dicyclohexylbenzothiazole-sulfenamide, butylbenzo-thiazolesulfenamide, or a combination of the compounds. The sulfenamide accelerator is more preferably N-cyclohexyl-2-benzo thiazolesulfenamide (CBS), diphenyl guanidine (DPG), or a combination of the compounds.

The vulcanizing agent is, for instance, a sulfur or organic sulfur provider. Based on 100 parts by weight of the used rubber, the total amount of the vulcanization agent and the vulcanization aid including the vulcanization activator and the vulcanization accelerator can be 0.1 to 15 parts by weight, preferably 0.5 to 5 parts by weight.

The antiager is, for instance, N-(1,3-dimethylbutyl)-N'-phenyl-p-phenylenediamine (6PPD). Based on 100 parts by weight of the used rubber, the amount of the antiager can be 1 to 10 parts by weight.

The third embodiment of the invention provides a tire. The tire contains any aforementioned modified high-cis isoprene polymer. Specifically, the tire can be produced by the rubber composition obtained by mixing any aforementioned modified high-cis isoprene polymer with, for instance, the aforementioned filler material, antioxidant, coupling agent, vulcanization activator, vulcanization accelerator, vulcanizing agent, antiager, or processing oil.

Experiments

The features of the invention are more specifically described in the following with reference to experimental embodiments. Although the following experiments are described, the materials used and the amount and ratio of each thereof, as well as handling details and handling procedures . . . etc., can be suitably modified without exceeding the scope of the invention. Accordingly, restrictive interpretation should not be made to the invention based on the experiments described below.

Preparation of Organometallic Catalyst System

Organometallic Catalyst System 1

Using n-hexane as a solvent and at room temperature, 0.162 moles of neodymium neodecanoate, 2.268 moles of triisobutylaluminum (hereinafter TIBA), and 0.3726 moles of diethylaluminum chloride (hereinafter DEAC) were used to prepare organometallic catalyst system 1. Moreover, in organometallic catalyst system 1, neodymium (Nd) accounts for 0.26 wt %; the number of moles of TIBA:the number of moles of neodymium neodecanoate is 14:1 (hereinafter TIBA/Nd=14); the number of moles of neodymium neodecanoate:the number of moles of the sum of DEAC and TIBA is 1:16.3; and the number of moles of neodymium neodecanoate:the number of moles of DEAC was controlled at 1:2.3.

Organometallic Catalyst System 2

In addition to changing the amount of TIBA such that TIBA/Nd=18, organometallic catalyst system 2 was prepared with the same method as the preparation of organometallic catalyst system 1.

Organometallic Catalyst System 3

In addition to changing the amount of TIBA such that TIBA/Nd=25, organometallic catalyst system 3 was prepared with the same method as the preparation of organometallic catalyst system 1.

Organometallic Catalyst System 4

Using n-hexane as a solvent and at room temperature, 0.162 moles of neodymium neodecanoate, 1.296 moles of diisobutyl aluminum hydride (hereinafter DIBAH), and 0.486 moles of DEAC were used to prepare organometallic catalyst system 4. In particular, Nd accounts for 0.26 wt %; the number of moles of DIBAH:the number of moles of neodymium neodecanoate is 8:1; the number of moles of neodymium neodecanoate:the number of moles of the sum of DEAC and DEBAH is 1:11; and the number of moles of neodymium neodecanoate:the number of moles of DEAC was controlled at 1:3.

Preparation of Modified High-Cis Isoprene Polymer

Experimental Embodiment 1

43.7 kg of n-hexane was injected into a reaction tank, and the reaction tank was preheated to 30° C. Then, after 31.25 kg of an n-hexane solution containing 40 wt % of isoprene was measured and injected into the reaction tank, 2 kg of n-hexane was injected into the reaction tank. Next, 1389 g of organometallic catalyst system 1 (Nd 0.26 wt %) was measured and injected into the reaction tank. After the reaction tank reached the maximum temperature (about 45° C.), 177 g of 3-glycidoxypropyltrimethoxysilane (n-hexane as solvent, concentration: 10 wt %, hereinafter KBM-403) and 52 g of tetraethoxysilane (n-hexane as solvent, concentration: 10 wt %, hereinafter TEOS) were measured, and the two were injected into the reaction tank at the same time. Then, after stirring for about 30 minutes, the polymer solution was discharged, and the polymer solution was stripped to remove the solvent. A drying step was then performed to obtain the modified high-cis isoprene polymer of experimental embodiment 1.

The modified high-cis isoprene polymer of experimental embodiment 1 was compared with a standard product for absorption value of infrared (740 $cm^{-1}$), and the cis-content in the isoprene repeating unit of the modified high-cis isoprene polymer of experimental embodiment 1 was measured to be 97.8%. The PDI (Mw/Mn) of the modified high-cis isoprene polymer of experimental embodiment 1 was 2.16. Using an Ultima-2 equipment to perform inductively coupled plasma with atomic emission spectroscopy (ICP-AES), the neodymium content of the modified high-cis isoprene polymer of experimental embodiment 1 was measured to be 292 ppm, and the aluminum content thereof was measured to be 1330 ppm.

Experimental Embodiments 2~5

In addition to the conditions shown in Table 1 below, the modified high-cis isoprene polymer of each of experimental embodiment 2 to experimental embodiment 5 was prepared with the same method as experimental embodiment 1. Moreover, the measurement results of the cis content, PDI, neodymium content, and aluminum content of the modified high-cis isoprene polymer of each of experimental embodiment 2 to experimental embodiment 5 are shown in Table 1.

Comparative Embodiment 1

60 kg of n-hexane was injected into a reaction tank and the temperature of the reaction tank was set to 60° C. for heating. Then, after 9 kg of butadiene was measured and injected into the reaction tank, 2 kg of n-hexane was injected into the reaction tank. Next, 900 g of the aforementioned organometallic catalyst system 4 (Nd 0.26 wt %) was measured and injected into the reaction tank. After reacting for 30 minutes, the polymer solution was stripped to remove the solvent. A drying step was then performed to obtain the high-cis isoprene polymer of comparative embodiment 1. Specifically, the main difference between the high-cis isoprene polymer of comparative embodiment 1 and the modified high-cis isoprene polymer of each of experimental embodiment 1 to experimental embodiment 5 is that no modifier was added when the high-cis isoprene polymer of comparative embodiment 1 was prepared. In other words, the high-cis isoprene polymer of comparative embodiment 1 is an unmodified high-cis isoprene polymer.

Similarly, the high-cis isoprene polymer of comparative embodiment 1 was compared with a standard product for absorption value of infrared (740 cm$^{-1}$), and the cis content of the high-cis isoprene polymer of comparative embodiment 1 was measured to be 95.8%. The PDI of the high-cis isoprene polymer of comparative embodiment 1 was 2.55.

Comparative Embodiment 2

The difference between comparative embodiment 2 and comparative embodiment 1 is that a high-cis isoprene polymer (i.e., unmodified high-cis isoprene polymer) was not self-prepared in comparative embodiment 2; instead, natural rubber STR #20 (purchased from Astlett Rubber Inc.) was directly used. Moreover, the measurement results of the cis content and the PDI of natural rubber STR #20 of comparative embodiment 2 are also shown in Table 1.

Before measurements of physical properties were performed on the modified high-cis isoprene polymer of each of experimental embodiment 1 to experimental embodiment 5, the high-cis isoprene polymer of comparative embodiment 1, and natural rubber STR #20 of comparative embodiment 2, mixing was performed on the modified high-cis isoprene polymer of each of experimental embodiment 1 to experimental embodiment 5, the high-cis isoprene polymer of comparative embodiment 1, and natural rubber STR #20 of comparative embodiment 2 with the following compounding method.

Compounding Method

The materials used in the compounding are as follows:
zinc oxide (ZnO, made by HA);
stearic acid (TPSA1865);
carbon black (N330, China Steel Chemical Corporation);
oil (CPC Corporation, Taiwan, #3);
n-tertiarybutyl-2-benzo-thiazolesulfennamide (TBBS, made by Akzo Nobel N.V.);
sulfur powder (Triangle Brand).

Steps of the compounding method are as follows.

Step (1): after 100 phr of a modified high-cis isoprene polymer (experimental embodiments 1~5) or an unmodified high-cis isoprene polymer (comparative embodiments 1~2) was mixed for 1 minute, 3 phr of ZnO and 2 phr of stearic acid were added and the mixture was mixed for 2.5 minutes. Then, 60 phr of carbon black and 15 phr of oil were added, and after the mixture was mixed for 4 minutes, and then the mixture was continually pressed for 6 minutes and then discharged. Step (1) was performed in a Banbury mixer.

Step (2): the raw material obtained in step (1) was aged for 30 minutes at room temperature.

Step (3): 0.9 phr of TBBS and 1.5 phr of sulfur powder were added to the raw material obtained in step (2). Step (3) was performed in a miller mixer (40° C.).

After step (1) to step (3) of <Compounding method> were performed on the modified high-cis isoprene polymer of each of experimental embodiment 1 to experimental embodiment 5 and the unmodified high-cis isoprene polymer of each of comparative embodiment 1 to comparative embodiment 2, measurements of Mooney viscosity, tensile strength (Tsb), elongation at break (Elb), tear resistance, difference of dynamic storage elastic modulus (ΔE'), and loss tangent (tan δ) were performed through sampling. The measurements are described below, and the results are shown in Table 1.

Mooney viscosity: measured by an MV-2000 machine of Alpha Technology Inc. with reference to an ASTM D-1646 method. The condition of measuring temperature was 100° C. and the measuring time was 1+4 minutes. The smaller value in Table 1 represents the lower viscosity of the end product and easier processing.

Tensile strength Tsb (kg/cm$^2$): measured with an ASTM D-412 Die C method. Tensile strength represents the maximum intensity the test specimen can sustain during the stretching process. The measuring mode of tensile strength was a stretching mode, the stretching rate was 500 mm/min, and the temperature was set at room temperature. The equipment used was tensile testing machine SHIMADZU AGS-500G (made by SHIMADZU). Moreover, the results of Tsb index (%) recited in Table 1=(measurement value of tensile strength for each of experimental embodiment 1 to experimental embodiment 5 and comparative embodiment 1 to comparative embodiment 2/measurement value of tensile strength for comparative embodiment 1)×100%. A greater value represents better tensile strength.

Elongation at break Elb (%): elongation at break represents the percentage of stretch of the test specimen at maximum intensity. Elongation at break is the degree of deformation of the test specimen when pulled apart. Moreover, the results of Elb index (%) recited in Table 1=(measurement value of elongation at break for each of experimental embodiment 1 to experimental embodiment 5 and comparative embodiment 1 to comparative embodiment 2/measurement value of elongation at break for comparative embodiment 1)×100%. A greater value represents greater elongation at break could be sustained.

Tear resistance: measured with an ASTM D-624 Die C method. Tear resistance represents the tear resistance of the test specimen, that is, the maximum tear resistance sustained before the test specimens are torn. The equipment used was tensile testing machine SHIMADZU AGS-500G (made by SHIMADZU). Moreover, the results of Tear index (%) recited in Table 1=(measurement value of tear resistance for each of experimental embodiment 1 to experimental embodiment 5 and comparative embodiment 1 to comparative embodiment 2/measurement value of tear resistance for comparative embodiment 1)×100%. A greater value represents better tear.

Difference of dynamic storage elastic modulus (ΔE'): the temperature for measuring dynamic storage elastic modulus (E) was set at 60° C. and the degree of deformation of the measurement was 0.5% to 10%. The difference of dynamic storage elastic modulus (ΔE') can be obtained by deducting the dynamic storage elastic modulus measured at a degree of deformation of 10% from the dynamic storage elastic modulus measured at a degree of deformation of 0.5%. The smaller value of the difference of dynamic storage elastic modulus (ΔE') represents better compatibility between the test specimen and carbon black. The equipment used was a viscoelasticity measuring device (dynamic mechanical analyzer DMA Q800, made by TA Instruments). Moreover, the difference of dynamic storage elastic modulus is represented as the difference of dynamic storage elastic modulus index (ΔE' index), the results of ΔE' index (%) recited in Table 1=(measurement value of ΔE' of comparative embodiment 1/measurement value of ΔE' of each of experimental embodiment 1 to experimental embodiment 5 and comparative embodiment 1 to comparative embodiment 2)×100%. In theory, a greater index value represents better compatibility with carbon black.

Loss tangent (tan δ): the temperature was set at 60° C. when loss tangent was measured, and the speed of temperature rise was 3° C. per minute. A greater loss tangent at 60° C. represents greater rolling resistance of the test specimen. The equipment used was a viscoelasticity measuring device (dynamic mechanical analyzer DMA Q800, made by TA Instruments). Moreover, the results of tan δ (60° C.) index recited in Table 1=(measurement value of tan δ (60° C.) of comparative embodiment 1/measurement value of tan δ (60° C.) of each of experimental embodiment 1 to experimental embodiment 5 and comparative embodiment 1 to comparative embodiment 2)×100%. A greater value represents lower rolling resistance and lower energy loss of the component used in the tire surface.

embodiment 5 has less rolling resistance in comparison to the unmodified high-cis isoprene polymer rubber of each of comparative embodiment 1 and comparative embodiment 2.

Based on the above, the invention provides a method for producing a modified high-cis isoprene polymer, and through the method a modified high-cis isoprene polymer can be prepared. The modified high-cis isoprene polymer has good compatibility with carbon black and exhibits excellent physical properties (such as tensile strength and tear resistance). The modified high-cis isoprene polymer can increase tire quality and is therefore suitable for the production of a tire.

Although the invention has been described with reference to the above embodiments, it will be apparent to one of the ordinary skill in the art that modifications to the described embodiments may be made without departing from the spirit

TABLE 1

|  | Experimental embodiment 1 | Experimental embodiment 2 | Experimental embodiment 3 | Experimental embodiment 4 | Experimental embodiment 5 | Comparative embodiment 1 | Comparative embodiment 2 |
| --- | --- | --- | --- | --- | --- | --- | --- |
| Organometallic catalyst system | Organometallic catalyst system 1 | Organometallic catalyst system 1 | Organometallic catalyst system 1 | Organometallic catalyst system 2 | Organometallic catalyst system 3 | Organometallic catalyst system 4 | — |
| cis-1,4 | 97.8 | 97.8 | 97.6 | 98 | 97.7 | 95.8 | 99.5 |
| KBM-403/Nd | 3:1 | 1:1 | 10:1 | 3:1 | 3:1 | — | — |
| KBM-403/TEOS | 3:1 | 1:3 | 10:1 | 3:1 | 3:1 | — | — |
| PDI | 2.16 | 2.17 | 2.66 | 2.3 | 2.68 | 60 | 0.013 |
| Aluminum content (ppm) | 1330 | 1298 | 1319 | 1664 | 2203 | — | — |
| Neodymium content (ppm) | 292 | 297 | 295 | 301 | 336 | — | — |
| Aluminum content/neodymium content | 4.55 | 4.37 | 4.47 | 5.53 | 6.55 | — | — |
| Mooney viscosity (MU) | 49 | 45 | 49 | 35 | 40 | 60 | 22 |
| Tsb index (%) | 188 | 192 | 186 | 173 | 200 | 100 | 159 |
| Elb index (%) | 132 | 128 | 131 | 121 | 171 | 100 | 118 |
| Tear index (%) | 163 | 159 | 157 | 178 | 167 | 100 | 141 |
| ΔE' index (%) | 124 | 117 | 114 | 127 | 103 | 100 | 111 |
| Tanδ (60° C.) index | 187 | 159 | 146 | 178 | 159 | 100 | 143 |

It can be seen from Table 1 that the isoprene repeating units in the modified high-cis isoprene polymers of experimental embodiment 1 to experimental embodiment 5 all contain more than 97% of a cis-1,4-structure. The mooney viscosity of the modified high-cis isoprene polymer of each of experimental embodiment 1 to experimental embodiment 5 is between 35 and 49, indicating good processability. Moreover, in comparison to comparative embodiment 1 and comparative embodiment 2, the modified high-cis isoprene polymers of experimental embodiment 1 to experimental embodiment 5 are all substantially excellent in terms of tensile strength, elongation at break, tear resistance, and difference of dynamic storage elastic modulus. The results indicate that the modified high-cis isoprene polymer of each of experimental embodiment 1 to experimental embodiment 5 exhibits good mechanical strength, and also prove that the modified high-cis isoprene polymer of each of experimental embodiment 1 to experimental embodiment 5 can have better compatibility with carbon black.

In comparison to comparative embodiment 1 and comparative embodiment 2, experimental embodiment 1 to experimental embodiment 5 perform better in terms of tan δ (60° C.), indicating the modified high-cis isoprene polymer of each of experimental embodiment 1 to experimental of the invention. Accordingly, the scope of the invention is defined by the attached claims not by the above detailed descriptions.

What is claimed is:

1. A method for producing a modified high-cis isoprene polymer, comprising:
performing a polymerization reaction on isoprene monomers in an organometallic catalyst system to form a high-cis isoprene polymer having an organometallic active site, wherein the organometallic catalyst system comprises:
an organic carboxylate of a rare earth metal;
an organoaluminum compound, wherein a molecular formula of the organoaluminum compound is $AlR_3$ or $HAlR_2$, R is a $C_1$~$C_8$ alkyl group; and
a halogen donor, wherein the halogen donor comprises alkylaluminum halide; and
reacting the high-cis isoprene polymer having the organometallic active site with a modifier mixture via the organometallic active site, wherein the modifier mixture comprises a first modifier and a second modifier, a molar ratio of each of the first modifier and the second modifier is 1:3 to 10:1, and the first modifier is a compound represented by formula 1:

$$X-R_1-Si(R_2)_3 \quad \text{formula 1,}$$

wherein X is a glycidoxy group, an isocyanate group, or a 2-(3,4-epoxycyclohexyl) group; R1 is a $C_2$~$C_3$ alkylene group; and R2 is a group selected from the group consisting of a $C_2$~$C_3$ alkyl group and a $C_1$~$C_3$ alkoxy group; and the second modifier is a compound represented by formula 2:

R3-Si(R4)$_3$  formula 2, wherein R3 is a group selected from the group consisting of a $C_1$~$C_{12}$ alkoxy group and a $C_1$~$C_{12}$ aryloxy group; and R4 is a group selected from the group consisting of a $C_1$~$C_{12}$ alkyl group, a $C_1$~$C_{12}$ alkoxy group, a $C_1$~$C_{12}$ aryloxy group, and a $C_1$~$C_{12}$ cycloalkyl group, wherein the modified high-cis isoprene polymer contains greater than 95% of an isoprene repeating unit.

2. The method of claim 1, wherein the organometallic catalyst system further contains isoprene monomer.

3. The method of claim 1, wherein a molar ratio of each of the organoaluminum compound and the organic carboxylate of the rare earth metal is 10:1 to 18:1.

4. The method of claim 1, wherein a molar ratio of each of the first modifier and the organic carboxylate of the rare earth metal is 1:1 to 5:1.

5. The method of claim 1, wherein the first modifier comprises 2-glycidoxyethyltrimethoxy silane, 2-glycidoxyethyltriethoxy silane, (2-glycidoxyethyl)methyldimethoxy silane, 3-glycidoxypropyltrimethoxy silane, 3-glycidoxypropyltriethoxy silane, methyl(3-glycidoxypropyl)dimethoxy silane, 2-(3,4-epoxycyclohexyl)ethyltrimethoxy silane, 2-(3,4-epoxycyclohexyl)ethyltriethoxy silane, 2-(3,4-epoxycyclohexyl)ethyl(methyl)dimethoxy silane, 3-isocyanatopropyltrimethoxy silane, 3-isocyanatopropyltriethoxy silane, 3-isocyanatopropylmethyldiethoxy silane, 3-isocyanatopropyltriisopropoxy silane, or a combination thereof.

6. The method of claim 1, wherein the second modifier comprises tetramethoxysilane, tetraethoxy silane, tetrapropoxysilane, tetrabutoxysilane, methyl(trimethoxy)silane, methyl(triethoxy)silane, methyl(tripropoxy)silane, ethyl(trimethoxy)silane, ethyl(triethoxy)silane, ethyl(tripropoxy) silane, propyl(trimethoxy)silane, propyl(triethoxy)silane, propyl(tripropoxy)silane, butyl(trimethoxy)silane, butyl(triethoxy)silane, butyl(tripropoxy)silane, dimethyldimethoxysilane, diethyldiethoxysilane, dicyclohexyl(diphenoxy) silane, didecyl(didecoxy) silane, tetradodecoxy silane, tetraphenoxy silane, or a combination thereof.

7. A modified high-cis isoprene polymer produced by the method of claim 1.

8. The modified high-cis isoprene polymer of claim 7, wherein an isoprene repeating unit in the modified high-cis isoprene polymer contains more than 97% of a cis-1,4-structure, and a polydispersity (PDI) of the modified high-cis isoprene polymer is greater than 1.5 and less than 2.7.

9. The modified high-cis isoprene polymer of claim 7, wherein the modified high-cis isoprene polymer contains neodymium in an amount greater than 120 ppm and less than 330 ppm.

10. The modified high-cis isoprene polymer of claim 7, wherein in the modified high-cis isoprene polymer, a content ratio of aluminum and neodymium is 2:1 to 8:1.

11. A tire containing a modified high-cis isoprene polymer produced by the method of claim 1.

12. A method for producing a modified high-cis isoprene polymer, comprising:
performing a polymerization reaction on isoprene monomers in an organometallic catalyst system to form a high-cis isoprene polymer having an organometallic active site, wherein the organometallic catalyst system comprises:
an organic carboxylate of a rare earth metal;
an organoaluminum compound, wherein a molecular formula of the organoaluminum compound is $AlR_3$ or $HAlR_2$, R is a $C_1$~$C_8$ alkyl group; and
a halogen donor, wherein the halogen donor comprises alkylaluminum halide; and
reacting the high-cis isoprene polymer having the organometallic active site with a modifier mixture via the organometallic active site, wherein the modifier mixture comprises a first modifier and a second modifier, a molar ratio of each of the first modifier and the second modifier is 1:3 to 10:1, and the first modifier is a compound represented by formula 1:

X—R1-Si(R2)$_3$  formula 1, wherein X is a glycidoxy group, an isocyanate group, or a 2-(3,4-epoxycyclohexyl) group; R1 is a $C_2$~$C_3$ alkylene group; and R2 is a group selected from the group consisting of a $C_2$~$C_3$ alkyl group and a $C_1$~$C_3$ alkoxy group; and the second modifier comprises tetramethoxysilane, tetraethoxy silane, tetrapropoxysilane, tetrabutoxysilane, methyl(trimethoxy)silane, methyl(triethoxy)silane, methyl(tripropoxy)silane, ethyl(trimethoxy) silane, ethyl(triethoxy)silane, ethyl(tripropoxy)silane, propyl(trimethoxy)silane, propyl(triethoxy)silane, propyl(tripropoxy)silane, butyl(trimethoxy)silane, butyl(triethoxy)silane, butyl(tripropoxy)silane, phenyl(trimethoxy)silane, phenyl(tri-ethoxy)silane, phenyl(tripropoxy)silane, phenyl(tri-n-butoxy) silane, dimethyldimethoxysilane, diethyldiethoxysilane, methylphenyl(dimethoxy)silane, methylphenyl(diethoxy)silane, dicyclohexyl(diphenoxy) silane, didecyl(didecoxy) silane, tetradodecoxy silane, tetraphenoxy silane, or a combination thereof,
wherein the modified high-cis isoprene polymer contains greater than 95% of an isoprene repeating unit.

* * * * *